United States Patent [19]
Williams

[11] Patent Number: 5,839,360
[45] Date of Patent: Nov. 24, 1998

[54] PROCESS OF AND SYSTEM FOR DISTRIBUTION, RECOVERY AND HANDLING OF BULK EDIBLE OIL AND OTHER FLUIDS

[76] Inventor: David R. Williams, 445 Calhoun Ave., Destin, Fla. 32540

[21] Appl. No.: 660,768

[22] Filed: Jun. 10, 1996

Related U.S. Application Data

[60] Provisional application No. 60/000,190 Jun. 13, 1995.

[51] Int. Cl.⁶ ................................................. A47J 37/00
[52] U.S. Cl. ............................... 99/408; 99/330; 99/403; 210/167; 210/DIG. 8; 426/438; 426/523
[58] Field of Search ............................. 99/330, 403–410; 210/167, DIG. 8; 426/523, 438–431

[56] References Cited

U.S. PATENT DOCUMENTS

| | | | |
|---|---|---|---|
| 3,368,682 | 2/1968 | Boots | 99/408 X |
| 3,707,907 | 1/1973 | Wilson et al. | 210/DIG. 8 |
| 4,420,006 | 12/1983 | Moore et al. | 99/408 X |
| 4,444,095 | 4/1984 | Anetsberger et al. | 99/408 |
| 4,646,793 | 3/1987 | Sherratt | 99/403 X |
| 4,890,548 | 1/1990 | Grob et al. | 99/330 X |
| 4,899,649 | 2/1990 | Grob et al. | 99/408 |
| 4,945,893 | 8/1990 | Manchester | 99/403 X |
| 4,974,501 | 12/1990 | Grob et al. | |
| 5,179,891 | 1/1993 | Chiu | 210/167 X |
| 5,228,985 | 7/1993 | Wells et al. | 210/167 |
| 5,247,876 | 9/1993 | Wilson et al. | 99/330 X |
| 5,249,511 | 10/1993 | Shumate et al. | 99/408 |

*Primary Examiner*—Timothy F. Simone
*Attorney, Agent, or Firm*—George Bode; Lisa Charouel

[57] ABSTRACT

A process of and system for distributing, filtering, storing, recovering, and disposing of bulk edible oil or other fluid. The filtering system having a filter box assembly, superstructure and fluid transfer unit functions to filter the edible oil or other fluid, transfer the fresh (new) oil or other fluid for use in commercial vats and transfer spent (old) oil or other fluid to an outdoor supply and disposal storage tank. Two three-way valves coupled to two manual three-way valve switch handles operate to control the fluid transfer unit to intake fresh or old fluid and to dispense of the fresh or old fluid. A mobile transport truck couples to the outdoor supply and disposal storage tank for filling the supply and disposal storage tank with fresh (new) oil or other fluid and retrieves the spent (old) oil or other fluid.

20 Claims, 10 Drawing Sheets

PROCESS OF AND SYSTEM FOR DISTRIBUTION, RECOVERY AND HANDLING OF BULK EDIBLE OIL AND OTHER FLUIDS

This application claims the benefit of priority of U.S. Provisional Application Ser. No. 60/000,190 filed Jun. 13, 1995.

Disclosure Document No. 370961 filed Feb. 9, 1995, is incorporated herein by reference as if set forth in full below.

BACKGROUND OF THE INVENTION

1. Field of the Invention

The present invention relates to a system for handling edible oils and other fluids and, particularly, to a system for distributing, filtering, storing, recovering and disposing of edible oils or other fluids, often while in a hot condition, used in open-top vat type vessels such as fryers, cookers, and related equipment widely used in commercial or institutional food preparation establishments.

2. General Background

Today's high volume food preparation establishments commonly use commercial cooking vats, the majority of which are deep fat fryers using cooking oil or solid shortening. The cooking oil and/or shortening products are held in many individual containers, usually from 35 pound plastic jugs encased in cardboard cartons, to 50 pound blocks of solid shortening in plastic wrapping enclosed in a cardboard box. The cardboard cartons and cardboard boxes are stored indoors, taking valuable space and creating an extremely volatile situation in the case of fire. They also occupy storage space when empty until they can be put into a dumpster and hauledoff.

The cardboard cartons and/or cardboard boxes are manually carried into the storeroom, stacked and manually transferred to and from the vats where they are manually lifted to waist height or higher to fill the cooking vats. Personnel frequently suffer sprains and back injuries when handling the cardboard cartons and/or cardboard boxes. Additionally, food absorbs oil during the cooking process whereby oil or solid shortening must be continually added to the hot oil or liquified shortening. This is a dangerous process resulting in spattering and splashes, particularly when chunks of solid shortening are dropped in the hot liquid. When 50 pound blocks of solid shortening are used, the blocks must be melted very slowly at a low heat to prevent a grease fire when the vats are filled. However, if a grease fire occurs, automatic fire suppressors flood the vats with chemicals, thereby causing a loss of all the oil or shortening. The cooking station must be shut down and cleaned up causing a loss of revenue.

Adding oil frequently results in spillage loss and creates opportunities for slips and falls next to open vats having oil heated to 340 to 375 degrees. Burns are commonplace in high volume food preparation establishments some of which lead to permanent disfigurement and disability.

When food is cooked, the oil quickly becomes fouled with bits of food, batter, breading seasonings, etc. The particles continue to overcook, becoming burned and scorched, thereby degrading the taste and quality of the food and reducing the useful life of the oil. To avoid this situation, it is desirable to filter out as many of these particles as is practical.

Operations that do not filter must throw away large amounts of oil continuously. However, to filter safely, the hot oil should be allowed to cool down to a safe temperature. Cooling of the oil can take from one to several hours, requiring the fry vat to be off-line whereby no income is produced. Most operations try to get back on line quicker, risking the hazards of drawing off hot splashing oil into low, open containers sitting under foot in busy work areas. Although dangerous, it occurs as a normal part of the business. Furthermore, often late at night, near closing time, an employee picks up hot metal pots or buckets full of scalding oil and stumbles out back on multiple trips through dim lighting to a fat disposal tank to dispose of the hot spent oil. To say the least, this is a hazardous situation that needs improving even more than the oil filtering process which is another risky oil handling process that occurs in several ways.

One of the most commonly used filtering process uses mechanical filters receiving oil from the vat drain spout directly into a large open tub. Typically a filtering screen sits in the bottom of the tub, drawing oil through the screen, up a vertical pipe having a pump and motor mounted atop, and discharges the filtered oil via a short length hose and nozzle back into the vat. Dragging the assembly from vat to vat and the lengthy wait required for the unit to cool down so that the motor, pump, pickup tube, screen and other parts can be disassembled and removed for cleansing before the sediment and debris can be manually scooped from the tub are just some of the disadvantages. Furthermore, there are problems of sanitation and storage of a large, greasy, open tub and bulky mechanical components required for the filtering process. After cleaning the sludge, sediment and residual waste, the oil is manually disposed. The disposed of oil is picked up by scrap oil dealers, some of which charge for the removal service, others may pay a small amount for the disposed spent oil. Once removed, the waste oil is out of mind with little concern for what happens to it. There have been instances, as in one case, where the removal company simply dumped the oil over acres of ground, thereby contaminating ground water and threatening an adjacent aquifer system. It is apparent that a comprehensive overall system is needed to prevent such environmental catastrophes.

Several filtering devices and systems for handling of bulk edible oil have been patented.

U.S. Pat. No. 4,462,915 is directed to an edible oil handling system wherein the unit sits down in the fry vat only as deep as the heat tubes passing at mid-height through the fry vat oil. Since many vats have narrow "deep wells" and/or slanting bottoms, removal and filtering of the oil becomes a major problem. After immersion, the unit must be manually transferred to and from fouled and unfouled oil in each vat and catchment container, potentially a very messy, spill-prone process.

U.S. Pat. No. 4,646,793 is directed to a system for supplying and disposing of oil. The system does not perform flushing or use a pressure dispensing wand for cleaning. The filtering and recirculation capability stores the oil overhead indoors and requires several pumps.

U.S. Pat. No. 5,249,511 is directed to a system with supply, disposal, and filtering capability but does not provide a sanitary draining system to flush away larger pieces of food or clumps of heavy bottom sediment. The system relies on a vacuum to extract chunks of debris from under the vat heating tubes and transfers the debris, unstrained and unfiltered, through an extensive piping and valve network to a large remote processing unit. Cross-contamination remains a possibility from a piping network flooded with fouled oil and food bits. Furthermore, the oil storage unit indoors is a fire hazard.

U.S. Pat. No. 3,368,682 is directed to a edible oil handling system which requires multiple pumps and separating devices and the pump motor to be continuously running. There is no provision for disposing of the spent oil.

U.S. Pat. Nos. 3,707,907, 4,945,893 and 5,179,891 are directed to edible oil handling systems requiring proprietary "built-in" mating components in order to function properly with the vat system.

While each of these efforts addresses various segments of edible oil handling, filtering and disposal, none present a safe and effective comprehensive system for distributing, storing, filtering, disposing and recycling of edible oils or other fluids, while in a hot condition.

SUMMARY OF THE PRESENT INVENTION

The preferred embodiment of the apparatus of the present invention solves the aforementioned problems in a straight forward and simple manner. What is provided is a process of and system for distributing, filtering, storing, recovering, and disposing of bulk edible oil or other fluids, often while in a hot condition, for use in open-top vat type vessels such as fryers, cookers, and related equipment widely used in commercial or institutional food preparation establishments.

In view of the above, it is an object of the present invention to provide a portable and compact filtering system having a filter box assembly, superstructure and fluid transfer unit for extending the useful life of the edible oil or other fluids.

It is a further object of the present invention to provide a supply and disposal storage tank located outdoors, thereby significantly reducing the fire hazards of the stored oil or other volatile fluids used in commercial or institutional food preparation establishments. The supply and disposal storage tank is the central distribution point for receiving fresh (new) fluid from a source and disposing of the waste (old) fluid.

Another object of the present invention is to provide mobile transportation of the waste (old) fluid to a recycling plant for use in other products.

Another object of the present invention is to provide a simple connecting structure for coupling the outdoor supply and disposal tank to the indoor filtering system which is further connected to one or more vats or catchment vessels.

Another object of the present invention is to provide an insulated enclosure for preventing unauthorized access to the supply and disposal storage tank.

In view of the above objects a feature of the present invention provides for flushing a drain pipe of the filtering box assembly for cleaning debris from the drain pipe line.

Another feature of the present invention is to eliminate manually filling the vats or catchment vessels with oil or other fluids thereby preventing sprains, burns and other injuries.

BRIEF DESCRIPTION OF THE DRAWING

For a further understanding of the nature and objects of the present invention, reference should be made to the following description, taken in conjunction with the accompanying drawing in which like parts are given like reference numerals and, wherein:

FIG. 5A is an exploded top plan view of an alternate embodiment of a common manifold line of the embodiment of FIG. 5;

FIG. 5-B is a front view of an alternate embodiment of an angled common manifold line of the embodiment of FIG. 5;

FIG. 5-B1 is a partial side view of the common manifold line of the embodiment of FIG. 5;

FIG. 6-A is a frontal view of the insulated tank enclosure of the present invention;

FIG. 6-A1 is a side view of the insulated tank enclosure of the present invention;

FIG. 8A is a front view fluid transfer controls of an alternate embodiment of the present invention; and, FIG. 8B is a front view of control handle positions of the system of the present invention.

DETAILED DESCRIPTION OF THE PREFERRED EMBODIMENT

Figure 7:
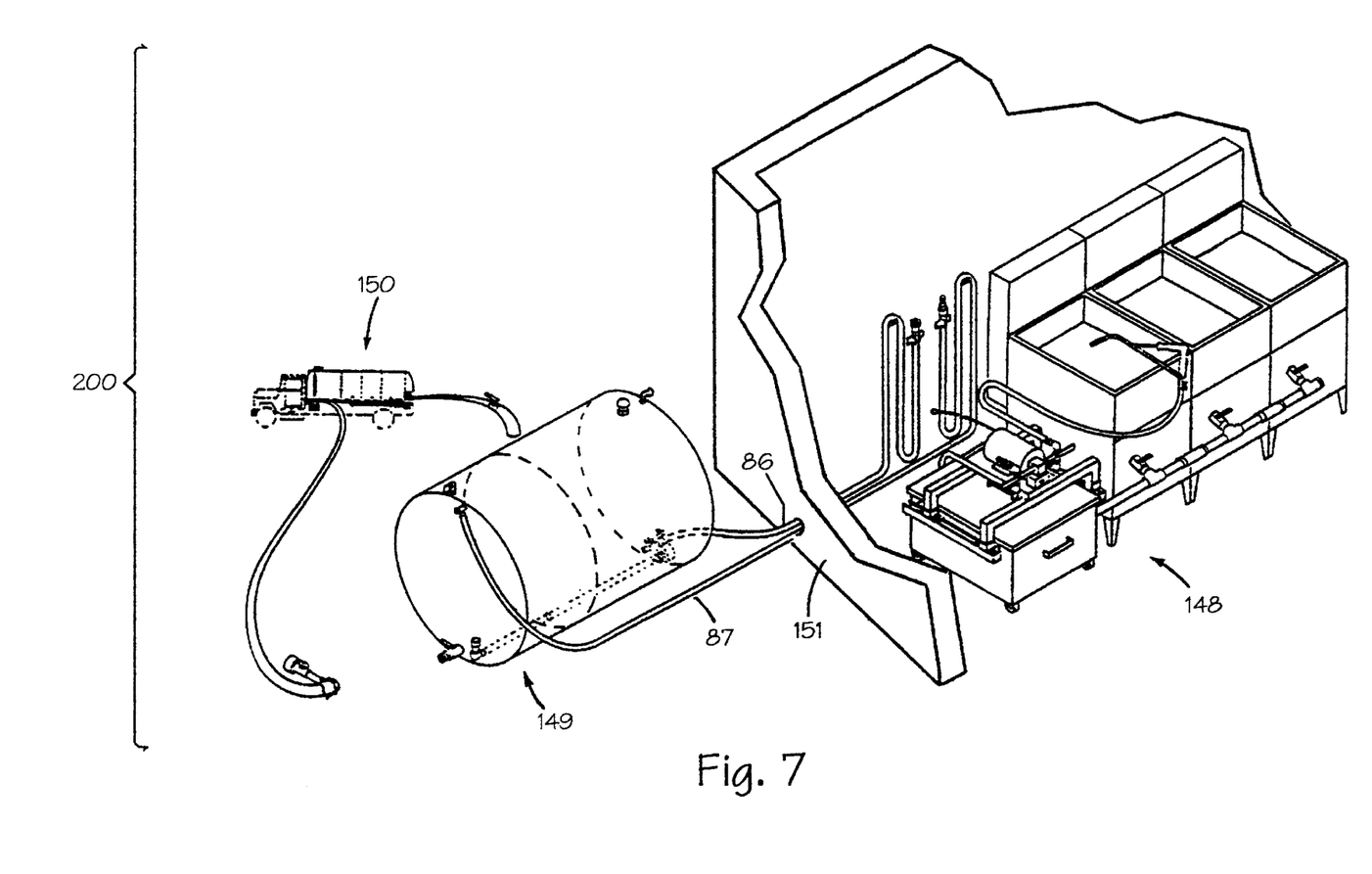
FIG. 7 is a perspective view of the interior worksite system, exterior worksite storage system and mobile distribution and recovery system of the preferred embodiment of the present invention.

Referring now to the drawing, and in particular FIG. 7, the system of the present invention is designated generally by the numeral 200. System 200 is generally comprised of a interior worksite system 148, exterior worksite system 149 and mobile distribution and recovery system 150.

Figure 1:
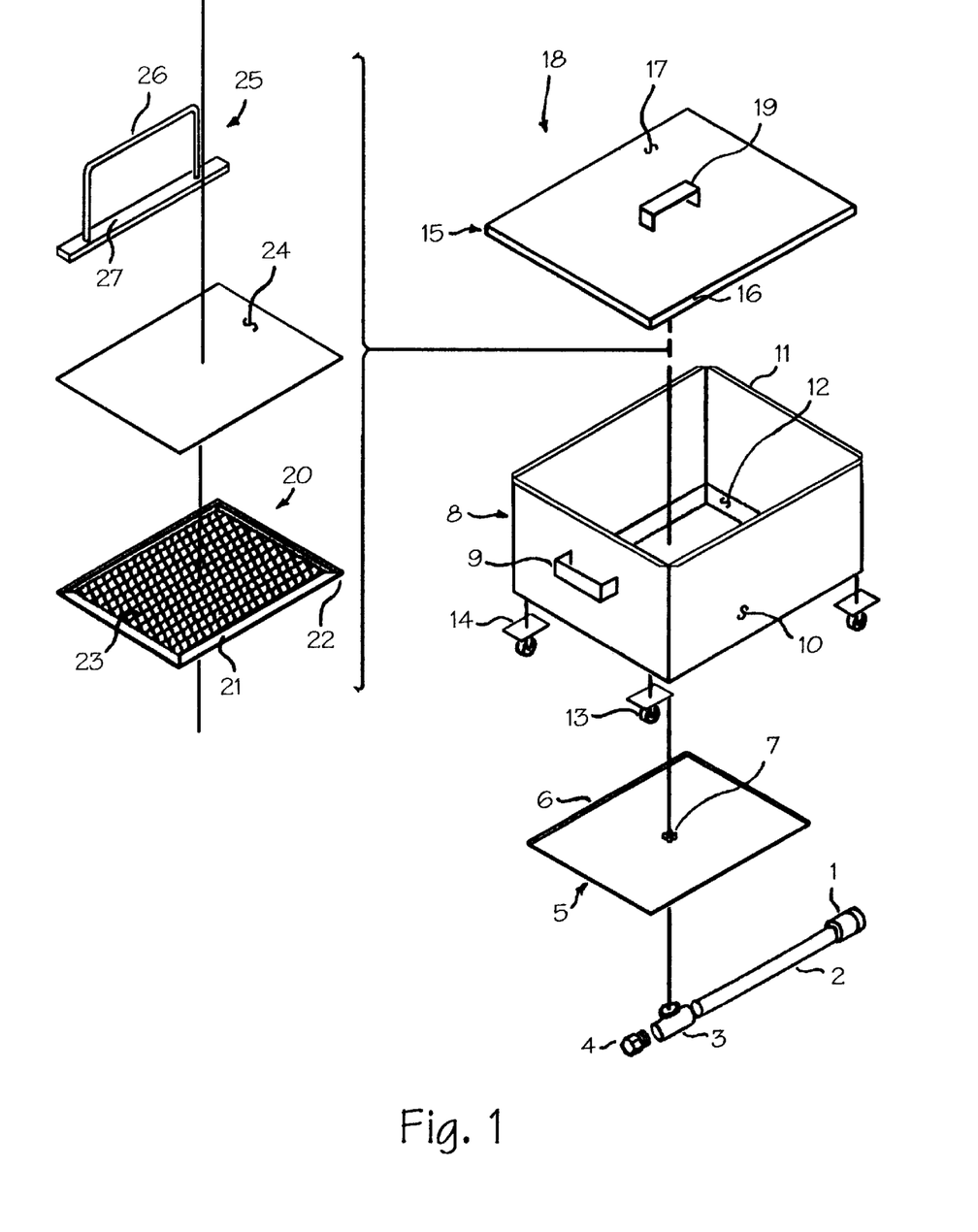
FIG. 1 is an exploded view of the filter box assembly of the filtering system of FIG. 2.

FIG. 1 illustrates the filter box assembly 18 of the interior worksite system 148 of the present invention. Filter box assembly 18 is comprised of filter box 8, sump 5, lid 15, filter element 20, septum 24 and holddowns 25. In the exemplary embodiment, filter box 8 is made of stainless steel. Filter box 8 is comprised of two handles 9 (only one shown), sides 10, lip 11 having an upward outward turn, bottom ledge 12, four casters 13 with wheels, preferably cushion rubber wheels, and four caster mounting pads 14 for affixing the casters 13 to the bottom of filter box 8. Lid 15 has on its top side 17 a lid handle 19. Side 16 of lid 15 is so constructed to provide a mating fit with lip 11 thereby securing lid 15 to filter box 8. Sump 5, the bottom floor of filter box 8, allows the use of flat sheet septum stock by dispersal of vacuum under weight comprises a drain strainer 7 having holes and sides 6. Drain strainer 7 couples to tee fitting 3. Sides 6 vertically diverge upward to form a tapered fit with matching filter element 20. Filter element 20 comprises filter element frame 21, filter grill 23 and vertically diverging upward corners 22. The vertically diverging upward corners 22 provide a small amount of elevation from the floor of sump 5, thereby dispersing a partial vacuum drawn through the drain strainer 7 and forming a collecting place for the filtered fluid. Filter grill 23 supports septum 24. Preferably, septum 24 is made of paper or any suitable porous material having a porosity of a micro-pore level to achieve the desired filtration level. Four filter holddowns 25 (only one shown) are positioned on top of the septum 24 thereby holding the septum 24 down. Filter holddowns 25 comprise bar 27 for providing a weight to hold down the septum 24 and handle 26 for picking up the bar 27 when removing the septum 24. Filter aides (not shown) of fine powder such as diatomaceous earth are often sprinkled over septum 24 to form a porous, spongelike filter cake for enhancing the filtering process and preventing clogging.

Figure 2:
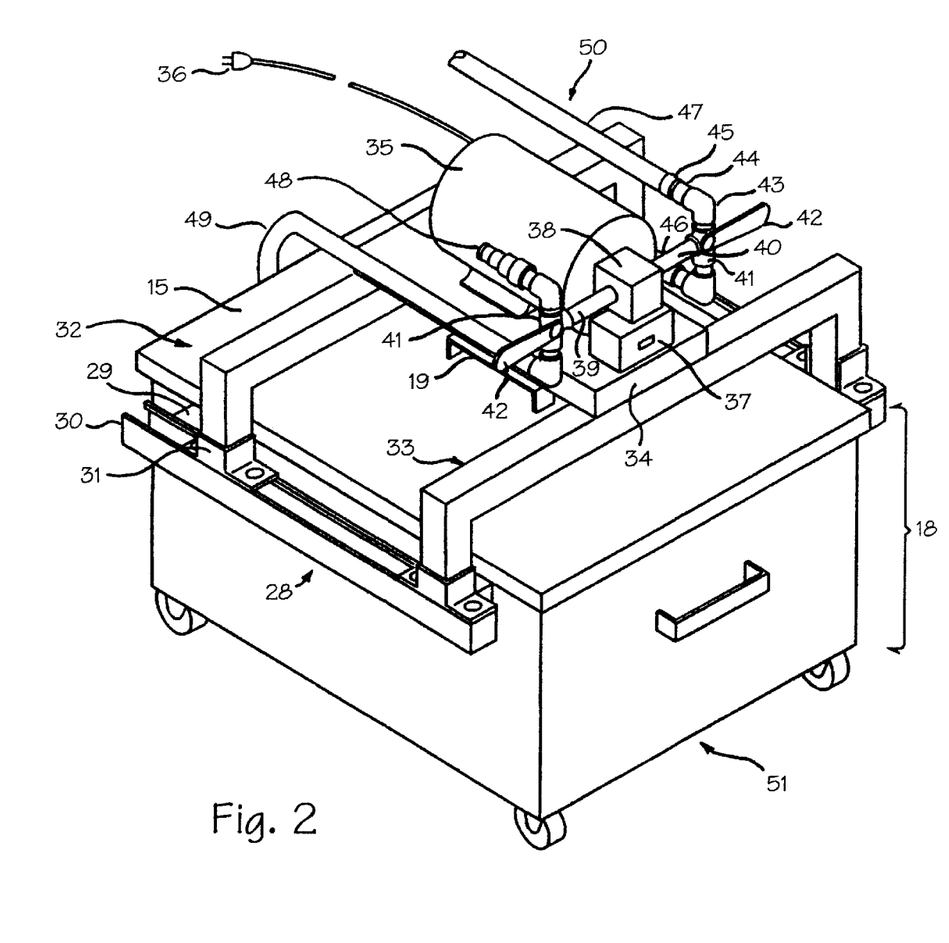
FIG. 2 is a perspective view of the filtering system of the embodiment of FIG. 7.

Oil or other fluid is suctioned down through the filter aides and septum 24 to drain strainer 7 and into tee fitting 3 by pump 38 (FIG. 2). The filter aides and septum filters the oil or fluid thereby separating the particulate matter from the oil or fluid. One end of tee fitting 3 is connected to a cleanout plug 4. The other end of tee fitting 3 is connected to one end of drain pipe 2. Drain pipe 2 is preferably connected to a female quick disconnect fitting 1 for connection to fluid intake line 49 (FIG. 2).

Filter box assembly 8 is of a simple construction for ease of use and cleaning. The filter box assembly 8 can be picked up by one man via handles 9 and drain pipe 2 can be easily rodded out by removing cleanout plug 4. However, simple hose flushing with hot water will suffice when cleaning drain pipe 2.

FIG. 2 illustrates the filtering system 51 of the interior worksite system 148 of present invention 200. Filtering system 51 comprises filter box assembly 18 (FIG. 1), supporting superstructure 28 and fluid transfer unit 50. Filter box assembly 18 is used as a vehicle or portable caddy to transport the fluid transfer unit 50 and supporting superstructure 28. Supporting superstructure 28 comprises four standoff structures 29 (only two shown) secured to filter box 8 and extended outward therefrom to distance two channel rails 30 far enough from the filter box such that lid 15 has sufficient side-to-side clearance for access. Further provided are movable sockets 31 mated with channel rails 30 thereby facilitating a sliding movement of sockets 31 to various locations along channel rails 30. Removable support frame 32 has four legs 33 which sit in and may be secured to movable sockets 31. Motor pump mounting base 34 is secured to removable support frame 32 and supports pump motor 35 and switch junction box 37.

The fluid transfer unit 50 comprises pump 38 coupled to switch junction box 37 and receives electrical power via power plug and cord 36. Power plug and cord 36 connects to a conventional 110 V.A.C. wall outlet. Pump 38 is provided with a pressure relief valve. Pump 38 has fluid intake manifold 39 on its inlet side and a fluid discharge manifold 40 on its outlet side. The fluid intake manifold 39 and fluid discharge manifold 40 couples to its own three-way valve 41. Each three-way valve 41 selectively directs fluid through elbows 43 via three-way valve switch handles 42.

On the inlet side of the fluid transfer unit 50, filtered fluid intake line 49 couples to three-way valve 41 via elbow 43 on one side of three-way valve 41. The other side of three-way valve 41 is coupled fresh fluid line male quick disconnect fitting 48 via another elbow 43. During the normal filtering mode, filtered oil or fluid is suctioned from drain pipe 2 through filtered fluid intake line 49 and aforementioned connections and discharged out through vat/wand dispensing line 47 and into a vat or catchment vessel. The normal filtering mode is performed by manipulating the two three-way valve switch handles 42 having corresponding positions 166 (FIG. 8B). For a fresh (new) fluid intake mode, the two three-way valve switch handles 42 are manipulated in accordance with positions 167 (FIG. 8B) whereby fresh oil or fluid is coupled to fresh fluid line male quick disconnect fitting 48 when fresh fluid supply line 86 (FIG. 5) is connected thereto for supplying fresh fluid from supply and disposal storage tank 115 (FIG. 6) to the vat/wand dispensing line 47.

On the outlet side, vat/wand dispensing line 47 connects to a swivel nut female connector 45. Swivel nut female connector 45 connects to elbow 43 via adaptor fitting 44. Adaptor fitting 44 connects to elbow 43 which connects to one side of three-way valve 41. The other side of three-way valve 41 connects to elbow 43 which connects to disposal line female quick disconnect fitting 46. During a waste (old) fluid disposal mode, the two three-way valve switch handles 42 are manipulated to positions 168 whereby waste oil or fluid passes through disposal line female quick disconnect fitting 46 when spent (old) fluid disposal line 87 (FIG. 5) is connected thereto for directing waste (old) fluid out into the supply and disposal storage tank 115 (FIG. 6). In the exemplary embodiment, vat/wand dispensing line 47 is a high temperature food grade pressure rated flexible hose.

Figure 3:
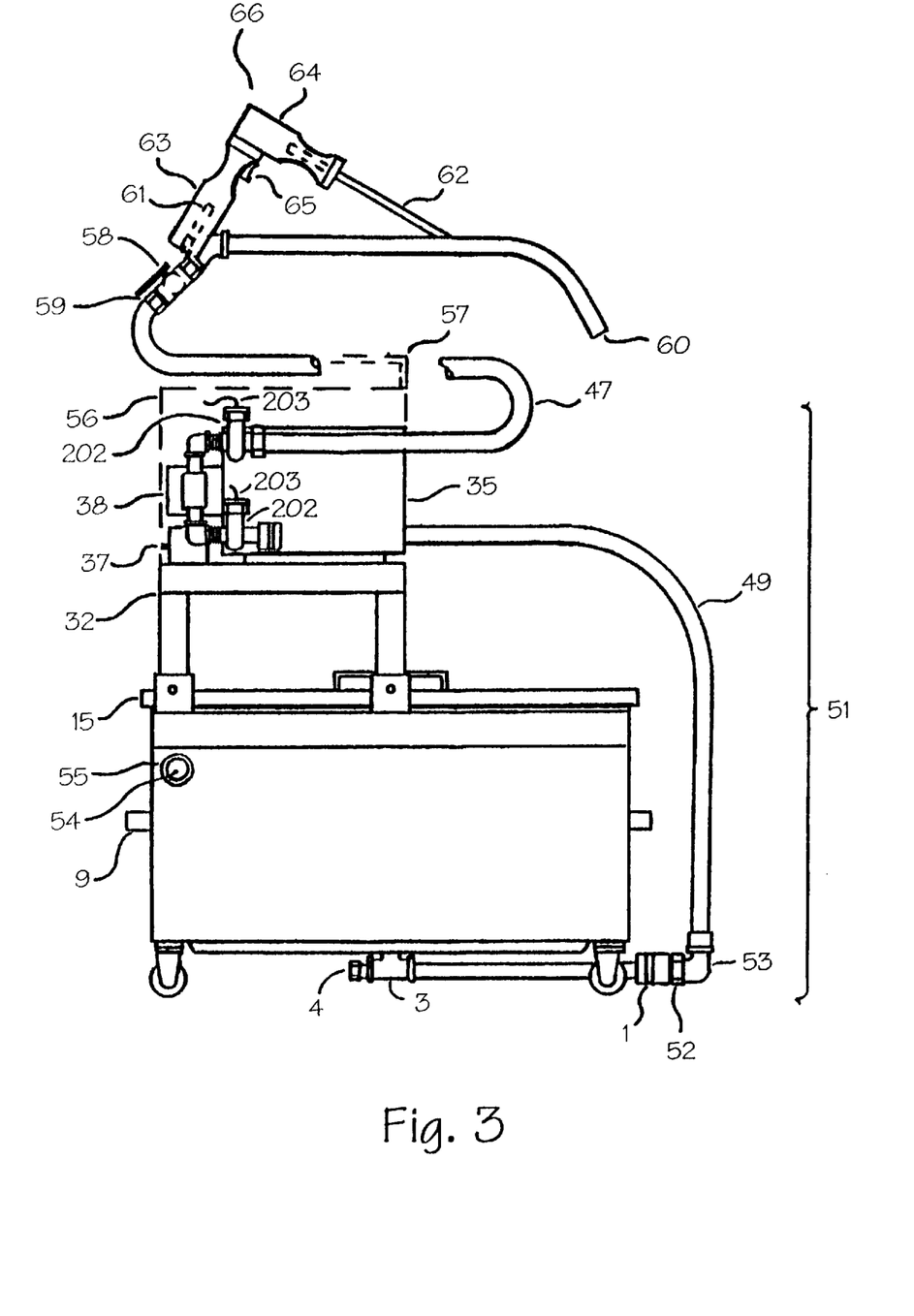
FIG. 3 is a profile view of the filtering system of the embodiment of FIG. 7.

FIG. 3 illustrates a profile view of filtering system 51 with pump motor housing 56 and dispensing wand system 66. Filtering system 51 is further comprised of an access opening 54 for supporting quick disconnect male adaptor 55 thereby accessing the interior of filter box 8. Access opening 54 is custom fitted on site. Further provided are quick disconnect male fitting 52 coupled to filtered fluid intake line 49 via swivel fitting 53. Quick disconnect male connector 52 couples to the female quick disconnect fitting 1 thereby completing the connection for suctioning the filtered fluid from drain pipe 2 through filtered fluid intake line 49. Pump motor housing 56 is depicted by the dotted line enclosure around pump motor 35, pump 38 and switch junction box 37. Pump motor housing 56 protects the enclosed equipment and is further equipped with toe rail 57.

Figure 8:
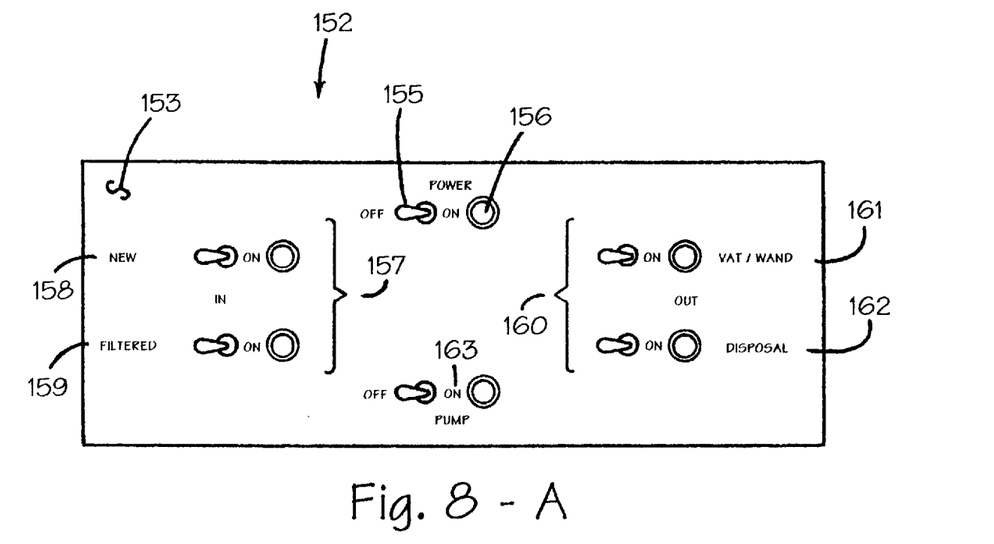

Oil or fluid exits the filtering system 51 via dispensing wand system 66. Oil or fluid flows through vat/wand dispensing line 47 into wand swivel male fitting 58 connected to an optional ball valve wand shutoff 59. Fluid or oil then enters wand nozzle 60. Rear handle shank 61 serves as a mounting post for rear insulated wand handle 63. Front handle shank 62 serves as a mounting post for a top insulated wand handle 64. An optional trigger 65 may be required for an electrically controlled module using electrical solenoid valves (not shown) in place of the two three-way valves 41 and manual three-way valve switch handles 42. An electrical wire line (not shown) for optional trigger 65 originates at the switch junction box 37. The electrical wire line is paired and routed with vat/wand dispensing line 47 to control the power to the pump motor when the optional trigger 65 is actuated. An electric solenoid valve 202 is provided on each of the discharge and intake lines (thus, there are four such valves 202 in the preferred embodiment). Lead wires 203 (two per side for a total of four (4)) connect valves 203 with toggle switches 158, 159, 161 and 162, best seen in FIG. 8-A. Control panel 153 is mounted on the front face of housing 56.

Figure 4:
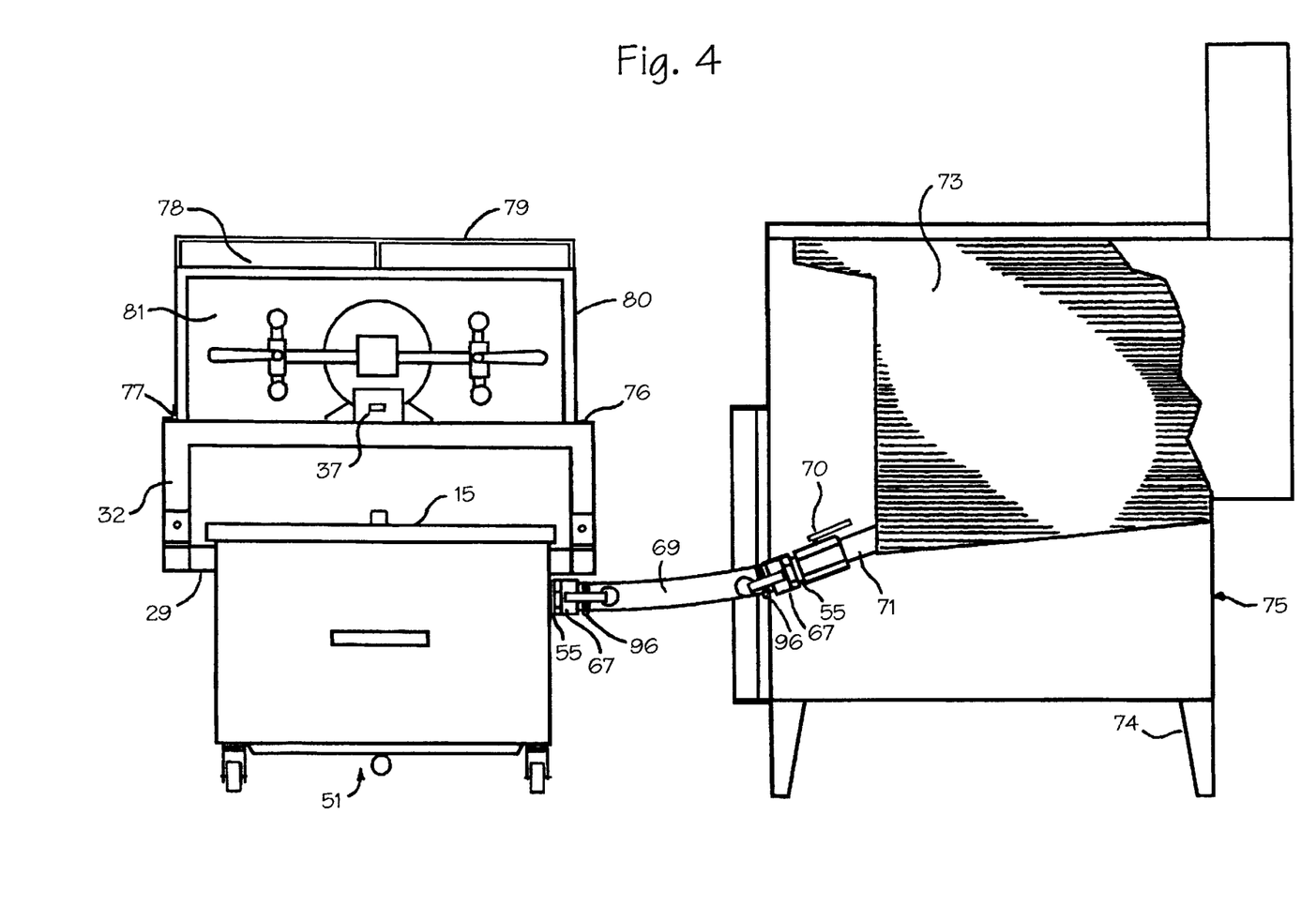
FIG. 4 is a front view of the filtering system connected to the catchment vessel (inside view and partially cut away) of the embodiment of FIG. 7.

FIGS. 4 and 4-A illustrate a position location which may be used in a portable "roll around" mode of operation which is desirable when there is no space available for a filter box at the end of a line of fryers, or if cooking vats supported by cabinet legs 74 are placed in several locations instead of being cascaded.

The filtering system is provided with a utility shelf area 78. The toe rail 57 (FIG. 3) is provided with toe rail stanchions with threaded ends 79. The pump motor housing 56 (FIG. 3) has a flange 80 and provides an open end 81 for access to the two three-way valve switch handles 42. The pump motor housing 56 is further provided with hinge 77 and latch 76.

Quick disconnect male fitting 55 passes through the filter box 8 (FIG. 3) at access opening 54, a hole pierced through filter box 8 on site to match exactly the altitude and location of the low terminal end of the common manifold line. Quick disconnect male fitting 55 connects to quick female disconnect fitting 67 which connects to vat jumper line 69. Vat jumper line 69 is secured via worm drive band clamps 96. Vat drain ball valve 70 is coupled to vat jumper line via connection or drain spout 71 of vat 73. Workstation 75 is provided with a cabinet housing 73.

This arrangement illustrates a vat jumper hose manifold passing through an open cabinet access.

Figure 5:
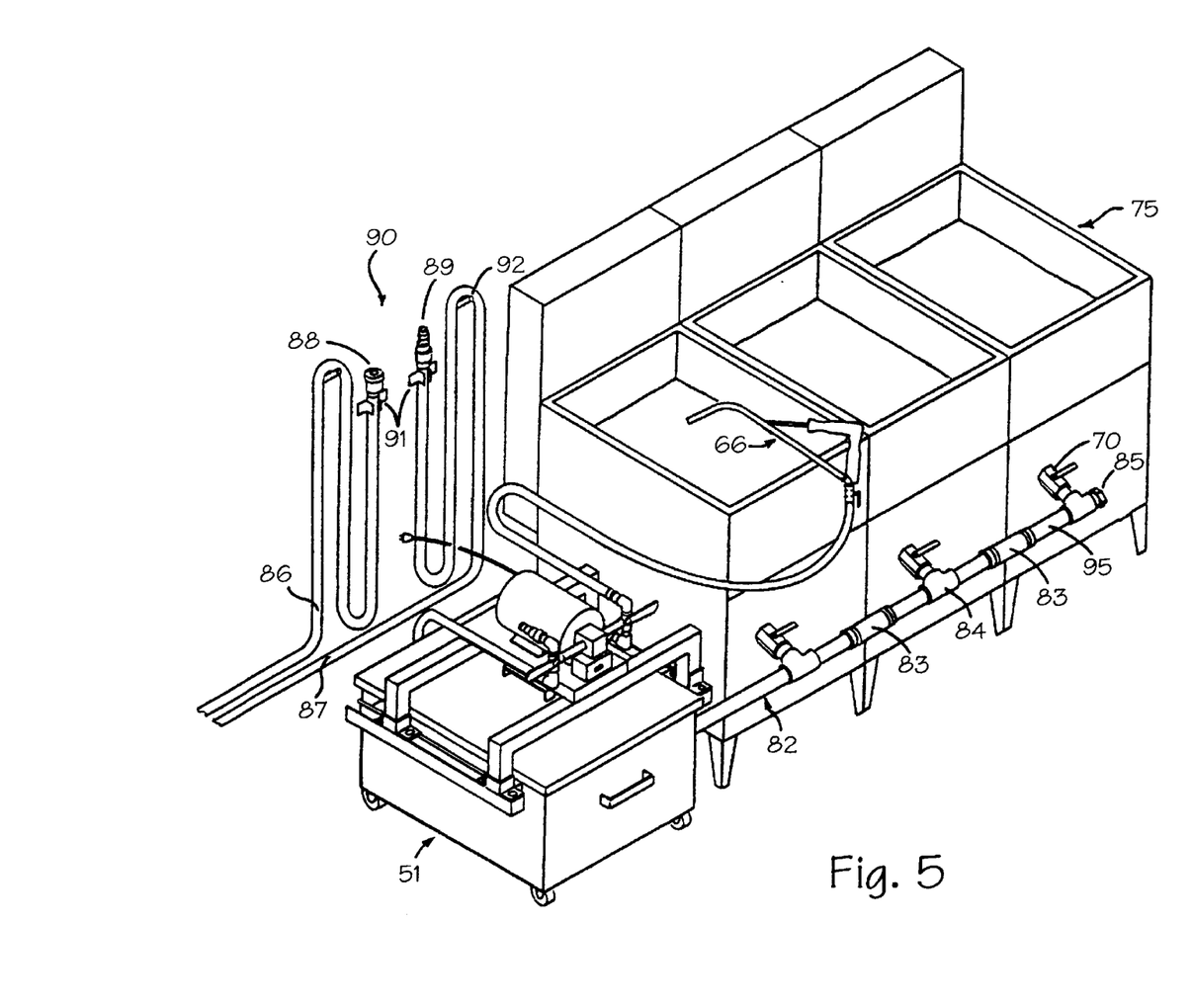
FIG. 5 is a top perspective view of the interior worksite system of the preferred embodiment of FIG. 7.
Figure 6:
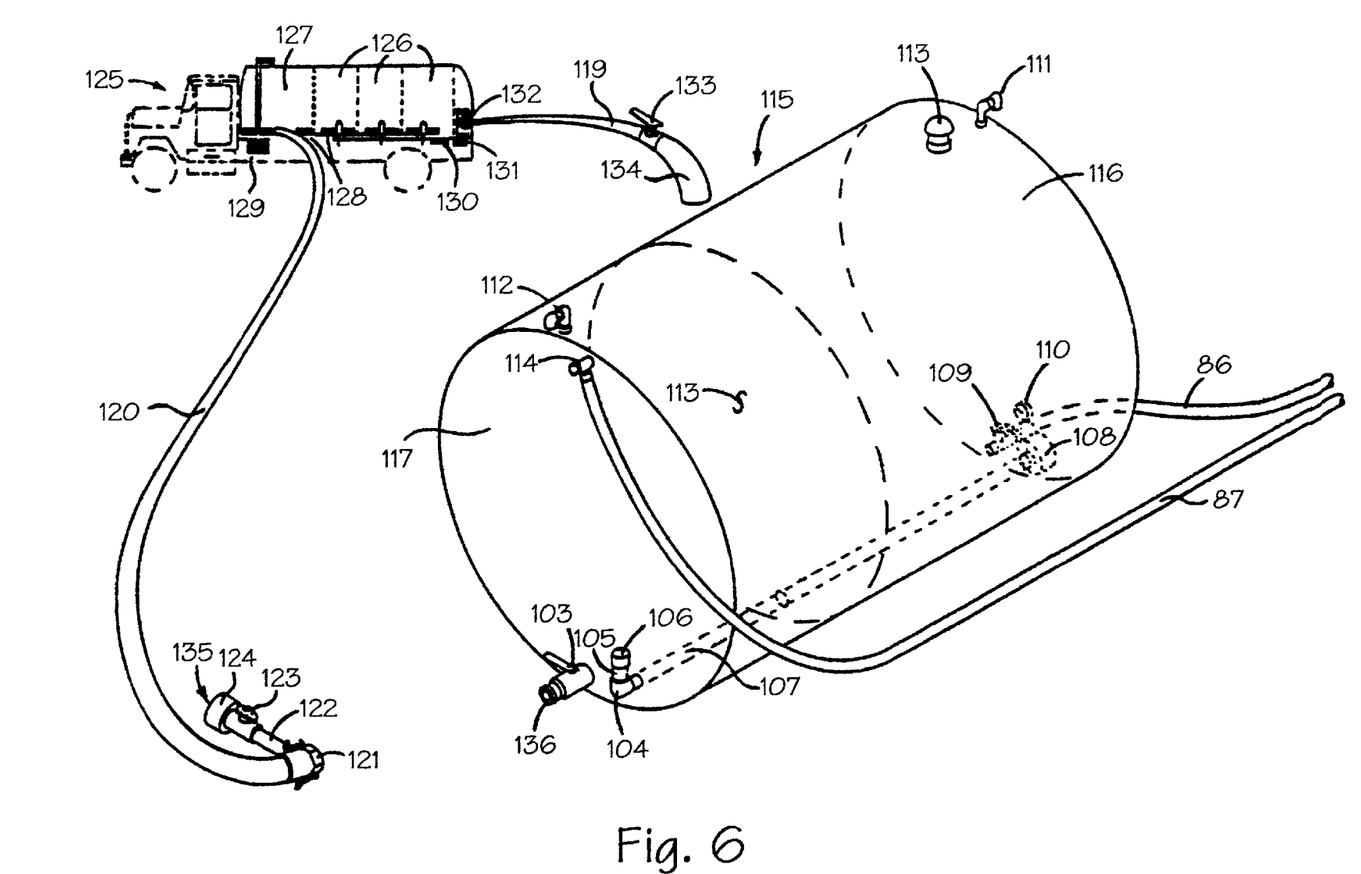
FIG. 6 is a perspective view of the exterior worksite system and illustrates the mobile distribution and recovery system of the embodiment of FIG. 7.

FIG. 5 illustrates the interior worksite system of the present invention. The interior worksite system of the present invention comprises filtering system 51 for connection to a docketing station 90 and to a plurality of cascaded catchment vessels.

Docketing station 90 comprises fresh (new) fluid supply line 86 and spent (old) fluid disposal line 87. Fresh (new) fluid supply line 86 is provided with female quick disconnect single shutoff connector 88 for connection to fresh fluid line male quick disconnect fitting 48 (FIG. 2) when the system operates to intake fresh fluid from the supply and disposal tank 115 (FIG. 5). Retaining clips 91 and line support means 92 support fresh (new) fluid supply line 86 and spent (old) fluid disposal line on the wall of the worksite, until needed. Spend (old) fluid disposal line 87 is provided with male quick disconnect fitting 89 for coupling the spent (old) fluid disposal line 87 to the disposal line female quick disconnect fitting 46 (FIG. 2) when the fluid in the system is discarded and stored in supply and disposal storage tank for later transport away from the worksite.

Filtering system 51 connects to workstation 75 via a common manifold line connecting a plurality of cascaded vats or catchment vessels. Quick disconnect male adaptor 55 (FIG. 3) connects filter box 8 (FIG. 3) to collector manifold 82. Vat drain ball valve 70 couples to a drain spout 71 of the catchment vessel which connects to tee fitting 84. Tee fitting 84 couples on one branch to toe nipple 95 and on the other branch to terminating clean-out plug 85. Toe nipple 95 then connects to an input side of flexible sleeve 83. The output side of flexible sleeve 83 is coupled to another toe nipple 95. The series connection of tee fitting 84, connected to toe nipple 95 and to flexible sleeve 83 and to another toe nipple 95 is repeated for each and every catchment vessel of the cascade. The output side of the last catchment vessel connects to collector manifold 82 whereby fouled fluid flows through the common manifold and into the filtering system 51.

With a number of cascaded catchment vessels or vats together on a common manifold, fouled fluid flows from the drain spout 71 when vat drain ball valve 70, is opened. FIG. 5-A illustrates an alternative embodiment of the common manifold line. The fouled fluid flows from vat drain ball valve 70 into connector nipple 93 which couples to tee fitting 94. Tee fitting 94 couples to toe nipple 95. Flexible sleeve 83 is secured by worm drive band clamps 96. The final tee fitting 84 couples to and/or toe nipple 95 and to quick disconnect fitting 97.

FIG. 5-B illustrates another alternate embodiment for the common manifold line. Manifold pipe 99 does not incorporate flexible sleeve 83. Vat jumper hose 69 is held in place at its ends by worm drive band clamps 96. The starting high end of the manifold line uses pivot point pipe nipple 98 for controlling the pitch downward of the manifold line. At the low end of the manifold line, quick disconnect fitting 97 couples to the filter box 8 (FIG. 3). The flexible sleeves held by worm drive band clamps 96 permit rapid field installation on relatively level surfaces with vat drains of similar heights. The manifold line must be preassembled before installation and once connected at the pivot point it is pitched downward to a vertically adjusted support bracket (low side) 100 mounted to the vat cabinet at attachment points 101 with bolts or self-tapping screws, as shown in FIG. 5-B1. The collector manifold pipe 99 is mounted firmly to support bracket 100 with a "U" bolt 102. The lower ends of all manifold types terminate with a quick coupler socket fitting 97. Optionally a short length of high temperature food grade flexible hose secured with said worm drive band clamps 96 can be used for added flexibility between quick disconnect fitting 97 and the manifold line. The quick disconnect fitting 97 connects to a quick disconnect male adaptor fitting 55 which passes through filter box 8 (FIG. 3) at access opening 54, a hole pierced through filter box 8 on site to match exactly the altitude and location of the low terminal end of the common manifold line.

FIG. 6 illustrates mobile distribution and recovery system 150 and exterior worksite system 149 of the present invention 200. In the recycling process, the mobile transport truck 125 links the production source (a refinery) to the end user (fast food restaurants, etc.) and thence back to a final destination (the same refinery or recycling plant).

The mobile transport truck 125 comprises multiple separate fresh (new) fluid compartments 126 and a large waste fluid compartment 127. All compartments are provided with heat strips 128 coupled to electrical resistant units in contact with or adjacent to the tank near the bottom, as best seen in FIG. 6. The electrical resistant units are equipped for battery or generator operation when the mobile transport truck is mobile, and conventional wall outlet power when parked at the distribution point. On delivery, fresh oil normally flows out by force of gravity. Additionally, a fresh fluid pump 130 is provided to pump the fresh (new) fluid out. The fresh fluid passes through a ticket printing flowmeter 131 to a hose reel 132 and through a truck supply hose 119. A supply shutoff valve 133 coupled to truck supply hose 119 controls the flow of fluid to truck dispensing nozzle 134.

In the exemplary embodiment, supply and disposal storage tank 115, made of stainless steal, is shaped cylindrically and positioned horizontally. Supply and disposal storage tank 115 comprises an interior tank partition 118 dividing a larger fresh (new) fluid compartment 116 from a smaller waste fluid compartment 117. The fresh (new) fluid is introduced into the fresh (new) fluid compartment 116 via the tank locking vent/fill fitting 113 when truck dispensing nozzle 134 is coupled thereto. In proximity is a fresh fluid vent 111 with provision for a dipstick. Fresh (new) fluid exits the fresh (new) fluid compartment 116 through a fresh fluid tank shutoff gate valve 109 and into fresh (new) fluid supply line 86. Adjacent to it is a capacity gauge 110 for indicating the fresh (new) fluid level. The capacity gauge 110 should be monitored to prevent an overflow of the fluid when flowing into the fresh (new) fluid compartment 116. Additionally, personnel should monitor the capacity gauge 110 to determine when the fresh (new) fluid supply is low and an order for fresh (new) fluid is required. Heat pipe 107 extends from outside of one tank end through both compartments 116 and 117 and projects outside the other tank end. The waste side of said heat pipe 107 is fitted with a heat pipe elbow 104 connected to expansion riser 105 and riser cap 106 connected thereto. They provide expansion room for a heat transfer fluid that distributes fluid the length of heat pipe 107, thereby transferring heat through the heat pipe wall to the supply and disposal storage tank contents, in both compartments 116 and 117, using a thermostatically controlled heat source 108, to provide viscosity maintenance when outside temperatures are below the solidification point of the edible oil or other fluid. Heating the fresh (new) fluid and the waste (old) fluid induces a slow circulation of the fluids, thereby preventing stale pockets of non-movement which can give rise to undesirable bacterial growth in some fluids. Fresh fluid flows into the worksite building via fresh fluid supply line 86 (FIG. 7). Waste (old) fluid flows out through spent fluid disposal line 87 and into the supply and disposal storage tank 115.

Waste (old) fluid ready for disposal enters supply and disposal storage tank 115 via waste fill fitting 114 adjacent to a waste vent/dipstick fitting 112 serving to relieve air and monitor the contents as compartment 117 when filled. Disposal discharge ball valve 103 serves as an exit. Disposal discharge ball valve 103 is fitted with a disposal quick disconnect male fitting 136 for coupling truck collection hose 120 via quick disconnect fitting 121. The waste fluid is retrieved from the waste fluid compartment 117 and communicated to the mobile transport truck 125 for disposing of the waste fluid.

Vacuum modulator 135 comprises air cleaner/muffler 124 and vacuum modulator valve 123. Vacuum modulator 135 is attached to truck collection hose pipe handle 122. The vacuum modulator 135 when coupled to quick disconnect fitting 121 introduces air to regulate suction of the waste fluid from waste fluid compartment 117 thereby preventing supply and disposal storage tank 115 from collapsing and providing for stronger suction force (when closed) for heavier fluids. Waste fluids can be pumped, but vacuum withdrawal via pump 129 located on the mobile transport truck 125 is preferred.

FIG. 6-A illustrates a frontal view and FIG. 6-A1 illustrates a profile view of a insulated tank enclosure 201. A hinged top cover 137 provides access to inspect the supply and disposal tank 115 and/or to fill the supply and disposal tank 115. Enclosure 201 has a protruded shape to off-shoot snow or other precipitation and provide space for logos or the sort. A top cover lock 139 prevents unauthorized access into enclosure 201. A top cover hinge 140 allows top cover 137 to rotate in an upward rearward motion. Corner boards 141 join siding panels 142 to form a rectangular enclosure. Foam insulation board 143 insulates the enclosure to retain heat. Supply side fittings 144 and opposite waste side fittings are both provided a housing access door 147 for inspection and service. The supply and disposal storage tank 115 sits on a vertically deposed tank cradle 145 at each end, preferably of flat cast concrete with an insulated cradle liner of rubber composition or the like. Between both cradle ends is positioned a cradle spine 146 made of an appropriate length of pipe approximately 4" in diameter with a threaded rod passing from end to end of the supply and disposal storage tank 115. Further provided are associated washers and nuts on each end (not shown). When tightened, the nuts compress the cradle ends against the pipe thereby forming a rigid compression structure which is difficult to capsize.

FIG. 7 illustrates a profile and perspective view of system 200 of the present invention. The interior worksite system 148 is shown inside the building. The worksite wall 151 is pierced to form a hole thereby allowing fresh (new) fluid supply line 86 and the spent fluid disposal line 87 to access the exterior worksite storage system 149 thereby connecting the two systems together. Mobile distribution and recovery system 150 operates to deliver the edible oil or other fluids and collect the waste (old) oil or other fluid for future recycling. In the exemplary embodiment, the worksite interior system 148 is stationed in the kitchen for a food service establishment.

FIG. 8A illustrates the fluid transfer system controls 152 for an electrically controlled model using electrical solenoid valves 202, best seen in FIG. 3, in place of the two three-way valves 41 and manual three-way valve switch handles 42. Fluid transfer system controls 152 comprises control panel 153 having thereon main power control switch 155 and indicator light 156. Upon actuation of switch 155, power is supplied to the controls of the control panel 153 and indicator light 156 illuminates. Power is further supplied to switch junction box 37 for energizing the electrical solenoid valves (not shown). New fluid selecting switch 158 having a corresponding indicator light whereby when actuated functions to initiate an intake transfer of new fluid from the supply and disposal storage tank 115 through fresh (new) fluid supply line 86 coupled to fresh fluid line make quick disconnect fitting 48. Filtered fluid switch 159 having a corresponding indicator light whereby when actuated functions to initiate an intake transfer of filtered fluid through the filtered fluid intake line 49. New fluid selecting switch 158 and filtered fluid switch 159 are the fluid intake transfer controls 157. Vat/wand selecting switch 161 having corresponding indicator light whereby when actuated functions to initiate the dispensing of fluid from vat/wand dispensing line. Disposal switch 162 having corresponding indicator light whereby when actuated functions to initiate the flow of waste fluid from the filtered fluid intake line 49 to disposal line female quick disconnect fitting when spent fluid disposal line 87 is connected thereto for transport to the supply and disposal storage tank 115. Pump switch 163 having corresponding indicator light whereby when actuated functions to energize the pump and motor to start the transfer process. In the exemplary embodiment, switches 155, 158, 159, 161, 162 and 163 are toggle switches. Light indicators are any suitable light source such as light emitting diodes.

FIG. 8B illustrates the control handle positions 164 for the two three-way valve switch handle 42. A normal filtering mode is performed when the two three-way valve switch handles 42 correspond to positions 166. A new fluid intake mode is performed when the two three-way valve switch handles 42 correspond to positions 167. A waste fluid disposal mode is performed when the two three-way valve switch handles 42 correspond to positions 168.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A system for handling edible oil or other fluids for use in commercial or institutional food preparation establishments, said system comprising:

(a) storage means for storing fresh and waste fluid;

(b) pump means with an intake manifold and a discharge manifold for transferring the fresh fluid from said storage means to a catchment vessel, transferring filtered fluid from a filtering means to said catchment vessel, and transferring said waste fluid to said storage means;

(c) a first three-way valve coupled to said intake manifold for connecting a fresh fluid line and a filtered fluid intake line to said intake manifold and having a first position and a second position;

(d) a second three-way valve coupled to said discharge manifold for connecting a spent fluid disposal line and a wand dispensing line to said discharge manifold and having a first position and a second position; and, (e) wherein when said first and second three-way valves are both in said first position, said second valve communicates said filtered fluid from said filtered fluid intake line to said wand dispensing line for dispensing into said catchment vessel; and when said first valve is in said second position and said second valve is in said first position, said first valve communicates said fresh fluid from said storage means through said fresh fluid line to said wand dispensing line; and when said first valve is in said first position and said second valve is in said second position, said second valve communicates said filtered fluid from said filtered fluid intake line to said fluid disposal line for transport to said storage means.

2. The system of claim 1, further comprises at least one tank truck for transporting the fresh fluid to said storage means and retrieving said waste fluid from said storage means, said at least one tank truck comprises:

(a) a waste fluid compartment for transporting said waste fluid for later recycling;

(b) at least one fresh fluid compartment for transporting said fresh fluid to said establishment;

(c) heating means located in said waste fluid compartment and said at least one fresh fluid compartment for maintaining the spent fluid and fresh fluid in liquid form;

(d) dispensing nozzle for coupling to said storage means for dispensing said fresh fluid into said storage means;

(e) dispensing line coupled to said dispensing nozzle for supplying the fresh fluid to said dispensing nozzle;

(f) connecting means for coupling to said storage means; and, (g) retrieving line coupled to said connecting means for retrieving said waste fluid from said storage means to said waste fluid compartment.

3. The system of claim 1, wherein said storage means comprises:

(a) partition means for partitioning said storage means;

(b) fresh fluid compartment for storing said fresh fluid;

(c) waste fluid compartment for storing said waste fluid;

(d) gauge means for communicating a level of said fresh fluid;

(e) heating means extending along the length of said storage means for maintaining the fresh fluid and the waste fluid at temperatures above a solidification point; and, (f) heat source means coupled to said heating means for controlling the temperature of said heating means.

4. The system of claim 1, further comprising a plurality of cascaded catchment vessels connected to a fouled fluid line for communicating fouled fluid from said plurality of cascaded catchment vessels to said filtering means.

5. The system of claim 4, wherein said fouled fluid line is connected to said plurality of cascaded catchment vessels for communicating said fouled fluid from said plurality of cascaded catchment vessels to said filtering means at an inclined angle wherein said fouled fluid line has a higher end and a lower end, with said lower end being connected to said filtering means.

6. The system of claim 1, wherein said filtering means comprises:

(a) a filter box having a top with a handle, four vertical sides with one side having an aperture for coupling to a fouled fluid line wherein fouled fluid enters said filter box through said aperture, and a bottom with four caster wheels attached at each corner of said bottom for moving said filter box and an aperture for coupling said bottom to said filtered fluid line such that the filtered fluid exits therethrough;

(b) a filter grill positioned on said bottom of said filter box for filtering the impurities from the fouled fluid;

(c) filter septum positioned on said filter grill for filtering the impurities to form said filtered fluid;

(d) means for securing said filter septum on said filter grill positioned on said filter septum;

(e) drain line connecting said bottom of said filter box to said filtered fluid line for communicating the filtered fluid to said filtered fluid line; and, (f) tee shaped fitting for coupling said aperture for coupling said bottom to said drain line for communicating the filtered fluid from said filter box to said drain line.

7. The system of claim 1, further comprising mounting means, said mounting means comprises:

(a) a pair of channel rails positioned on opposite sides of said filter box;

(b) four standoffs, two each positioned between each of said channel rails and said filter box;

(c) support frame including four support legs positioned above said top of said filter box for mounting said pump means; and, (d) movable sockets mounted on each of said channel rails for receiving said support legs thereby securing said support frame to said channel rails.

8. The system of claim 1, further comprising wand assembly means coupled to said wand dispensing line for controlling the dispensing of said filtered fluid into said catchment vessel and said fresh fluid into said catchment vessel.

9. A system for handling heated edible oil or other fluids for use in commercial establishments, said system comprising:

(a) storage means for storing fresh and waste fluid;

(b) pump means with an intake manifold and a discharge manifold for transferring the fresh fluid from said storage means to a catchment vessel, transferring filtered fluid from a filtering means to said catchment vessel, and transferring said waste fluid to said storage means;

(c) a first three-way valve coupled to said intake manifold for connecting a fresh fluid line and a filtered fluid intake line to said intake manifold and having a first position and a second position;

(d) a second three-way valve coupled to said discharge manifold for connecting a spent fluid disposal line and a wand dispensing line to said discharge manifold and having a first position and a second position; and, (e) means for controlling said first and second three-way valves to said first position to perform a normal filtering mode, controlling said first valve to said second position and said second valve to said first position to perform a fresh fluid intake mode; and controlling said first valve to said first position and said second valve to said second position to perform waste fluid disposal mode.

10. The system of claim 9, further comprises at least one tank truck for transporting the fresh fluid to said storage means and retrieving said waste fluid from said storage means, said at least one tank truck comprises:

(a) a waste fluid compartment for transporting said waste fluid for later recycling;

(b) at least one fresh fluid compartment for transporting said fresh fluid to said establishment;

(c) heating means located in said waste fluid compartment and said at least one fresh fluid compartment for maintaining the spent fluid and fresh fluid in liquid form;

(d) dispensing nozzle for coupling to said storage means for dispensing said fresh fluid into said storage means;

(e) dispensing line coupled to said dispensing nozzle for supplying the fresh fluid to said dispensing nozzle;

(f) connecting means for coupling to said storage means; and, (g) retrieving line coupled to said connecting means for retrieving said waste fluid from said storage means to said waste fluid compartment.

11. The system of claim 9, wherein said storage means comprises:

(a) partition means for partitioning said storage means;

(b) fresh fluid compartment for storing said fresh fluid;

(c) waste fluid compartment for storing said waste fluid;

(d) gauge means for communicating a level of said fresh fluid;

(e) heating means extending along the length of said storage means for maintaining the fresh fluid and the waste fluid at temperatures below a solidification point; and, (f) heat source means coupled to said heating means for controlling the temperature of said heating means.

12. The system of claim 9, further comprising a plurality of cascaded catchment vessels connected to a fouled fluid line for communicating fouled fluid from said plurality of cascaded catchment vessels to said filtering means.

13. The system of claim 12, wherein said fouled fluid line is connected to said plurality of cascaded catchment vessels for communicating said fouled fluid from said plurality of cascaded catchment vessels to said filtering means at an inclined angle wherein said fouled fluid line has a higher end and a lower end, with said lower end being connected to said filtering means.

14. The system of claim 9, wherein said filtering means comprises:

(a) a filter box having a top with a handle, four vertical sides with one side having an aperture for coupling to a fouled fluid line wherein fouled fluid enters said filter box through said aperture, and a bottom with four caster wheels attached at each corner of said bottom for moving said filter box and an aperture for coupling said bottom to said filtered fluid line such that the filtered fluid exits therethrough;

(b) a filter grill positioned on said bottom of said filter box for filtering the impurities from the fouled fluid;

(c) filter septum positioned on said filter grill for filtering the impurities to form said filtered fluid;

(d) means for securing said filter septum on said filter grill positioned on said filter septum;

(e) drain line connecting said bottom of said filter box to said filtered fluid line for communicating the filtered fluid to said filtered fluid line; and, (f) tee shaped fitting for coupling said aperture for coupling said bottom to said drain line for communicating the filtered fluid from said filter box to said drain line.

15. The system of claim 9, further comprising mounting means, said mounting means comprises:

(a) a pair of channel rails positioned on opposite sides of said filter box;

(b) four standoffs, two each positioned between each of said channel rails and said filter box;

(c) support frame including four support legs positioned above said top of said filter box for mounting said pump means; and, (d) movable sockets mounted on each of said channel rails for receiving said support legs thereby securing said support frame to said channel rails.

16. The system of claim 9, further comprising wand assembly means coupled to said wand dispensing line for controlling the dispensing of said filtered fluid into said catchment vessel and said fresh fluid into said catchment vessel.

17. A method of handling bulk edible oils or other fluids used in commercial or institutional food preparation establishments, the method comprising:

(a) storing fresh and spent fluid in a storage means;

(b) connecting a fresh fluid line to a transferring means;

(c) controlling a first valve to a second position;

(d) controlling a second valve to a first position;

(e) pumping fresh fluid from a storage means through said first valve to a wand dispensing line;

(f) dispensing said fresh fluid in a catchment vessel;

(g) heating said fresh fluid when needed;

(h) controlling said first valve to a first position;

(i) cooking with said fresh fluid to form fouled fluid;

(j) filtering said fouled fluid for removing particulate matter to form filtered fluid;

(k) dispensing said filtered fluid into said catchment;

(l) repeating steps I through k as needed;

(m) connecting a fluid disposal line to said transferring means;

(n) controlling said second valve to a second position; and, (o) communicating filtered fluid from said filtered fluid intake line to said storage means filtered fluid to form waste fluid.

18. The method of claim 17, further comprising the steps of:

(p) transporting the fresh fluid to said storage means; and, (q) retrieving said waste fluid from said storage means to a transport means.

19. The method of claim 17, wherein said storing step (a) comprises the steps of:

i. communicating a level of said fresh fluid;

ii. heating said fresh fluid and said waste fluid; and, iii. maintaining said fresh fluid and said waste fluid at temperatures above a solidification point.

20. The method of claim 17, further comprising the step of flushing periodically a drain line coupled to said filtered fluid intake line.

* * * * *